United States Patent [19]

Matey

[11] 4,447,381

[45] May 8, 1984

[54] APPARATUS AND METHOD FOR MAKING A VIDEO DISC

[75] Inventor: James R. Matey, Mercerville, N.J.

[73] Assignee: RCA Corporation, New York, N.Y.

[21] Appl. No.: 440,243

[22] Filed: Nov. 8, 1982

[51] Int. Cl.³ .............................................. B29D 17/00
[52] U.S. Cl. ................................... 264/107; 425/411; 425/810
[58] Field of Search ................ 425/810, 411; 264/106, 264/107

[56] References Cited

U.S. PATENT DOCUMENTS

| 3,989,436 | 11/1976 | McNeely | 425/242 |
| 4,302,175 | 11/1981 | McNeely | 425/810 X |
| 4,327,047 | 4/1982 | McNeely | 264/107 |

*Primary Examiner*—Thomas P. Pavelko

*Attorney, Agent, or Firm*—Birgit E. Morris; Donald S. Cohen

[57] ABSTRACT

A video disc is molded in an apparatus which includes a pair of opposed mold members each having a mold cavity in its surface which faces the other mold member and a stamper is mounted across the mold cavity in each of the mold members. Each stamper has on its surface a surface relief pattern arranged along a spiral path. The stampers are arranged on the mold members so that any imperfections in the mold members which may pass through the stampers and be impressed on the disc being molded are aligned with areas of the stamper which do not contain information which impacts the picture quality so that such imperfections are impressed in areas of the disc which will not adversely impact the perceived picture quality during playback of the disc.

10 Claims, 3 Drawing Figures

APPARATUS AND METHOD FOR MAKING A VIDEO DISC

BACKGROUND OF THE INVENTION

The present invention relates to an apparatus and method for molding a video disc and more particularly to such an apparatus and method which minimizes the adverse effects of defects in the mold on the quality of the picture produced by the disc.

A video disc in general is a flat, circular disc of a plastic material, having recorded information in the form of a surface relief pattern arranged in a spiral path on the surfaces of the disc. In order to achieve compatibility of the playback of the information on the disc and the display of such information on a television screen, it is necessary to provide the disc with blanking intervals periodically along the information track. These blanking intervals are produced at positions where the electron beam in the television tube must retrace either from the end of one line to the beginning of the next line of the picture (horizontal blanking), or from the bottom of the screen to the top (vertical blanking). The speed of the information pickup mechanism, such as a stylus or laser beam, along the information track is often such that the blanking intervals become aligned along radial lines which are uniformly angularly spaced around the surface of the disc. These lines are generally referred to as "sync lines".

Video discs are generally made in a mold press which includes a pair of opposed mold members having mating mold cavities in their opposed surfaces and at least one of which is movable toward and away from the other. Each of the mold plates has a channel extending therethrough adjacent to and extending across its surface which contains the mold cavity. These channels receive a flow of a temperature control medium, such as steam for heating or water for cooling, to control the temperature of the mold cavity. The channel is generally in the form of concentric, circular grooves connected together by radially extending grooves. A stamper is mounted across the mold cavity of each mold plate. A stamper is a thin metal plate having on the surface thereof the negative of the surface relief pattern to be molded on the surface of the disc. If the disc is being molded in a compression molding press, such as described in U.S. Pat. No. 4,327,047 to M. L. McNeely, issued Apr. 27, 1982, entitled "Method for Producing Disc Records Having Molded-in Center Holes", a preform of the plastic material is placed between the heated mold plates which are brought together until the stampers on both mold plates contact the preform so as to heat the preform. As the mold plates are moved further together to the closed condition of the mold, the preform is compressed and the material of the preform is caused to flow radially outwardly to completely fill the mold cavity when the mold plates reach their closed position. The mold plates are then cooled to harden the plastic material and form a rigid disc. The disc has impressed in its surfaces the surface relief pattern on the surfaces of the stamper. If the disc is being molded by an injection molding press, such as described in U.S. Pat. No. 3,989,436 to M. L. McNeely, issued Nov. 2, 1976, entitled "Apparatus for Producing Injection Molded and Generally Apperttured Disc Records" the mold plates are brought together to their closed position and the molten plastic material is injected into the mold cavity formed between the mold plates. After the mold cavity is completely filled with the plastic, the mold plates are cooled to harden the plastic and form a rigid disc. The disc has impressed in its surfaces the surface relief pattern on the surfaces of the stampers.

A problem that has arisen in using these techniques for molding video discs is that because of the thinness of the stampers, imperfections in the surfaces of the mold plates can pass through the stampers and result in imperfections in the surfaces of the disc which adversely affect the quality of the video information during the disc playback. For example, it has been found that the radially extending grooves which interconnect the concentric grooves in the mold plates can cause imperfections in the surfaces of the disc which extend across the turns of the spiral path of the surface relief patterns and thus interfere with the playback of the disc. Although it would be most desirable to correct or eliminate such imperfections, there are times when such is either not possible or too expensive to accomplish. Therefore, it would be desirable to be able to mold discs using such mold plates without causing adverse imperfections in the disc.

SUMMARY OF THE INVENTION

According to the present invention, the stampers are arranged on the mold plates so that any imperfections in the surface of the mold plates are aligned with areas of the stampers that do not have thereon information which will impact the perceived picture quality such as the blanking intervals. Thus, the imperfections will be impressed on areas of the surface of the disc which will not adversely impact the perceived picture quality during the playback of the disc.

DETAILED DESCRIPTION OF THE PREFERRED EMBODIMENT

Figure 1:
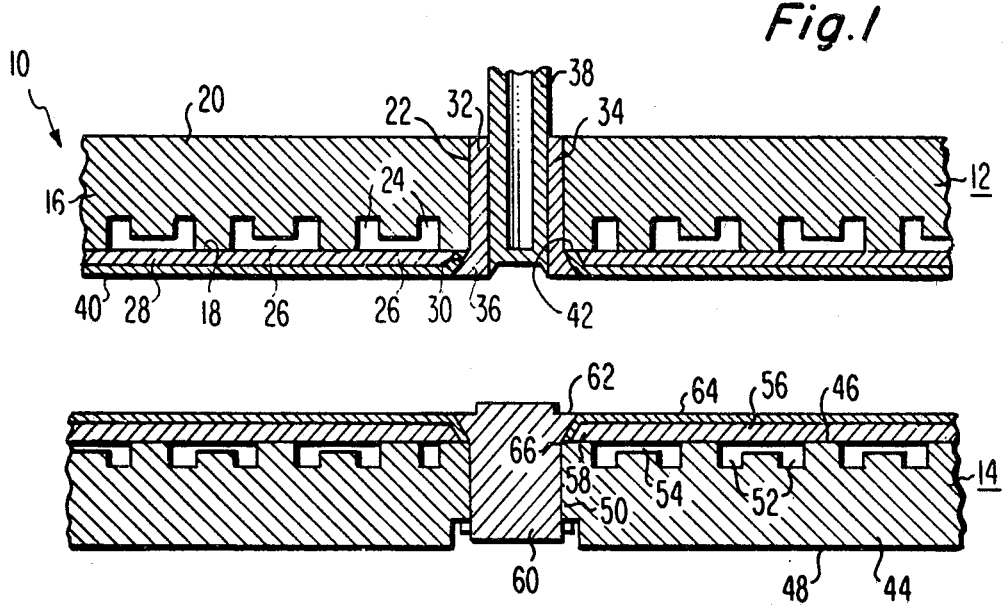
FIG. 1 is a sectional view of a portion of a form of a disc molding apparatus which utilizes the present invention.

Referring to FIG. 1, a compression molding apparatus which incorporates the present invention is generally designated as 10. The molding apparatus 10 includes upper and lower mold members 12 and 14. The upper mold member 12 includes a base plate 16 having inner and outer flat surfaces 18 and 20 respectively, and a central hole 22 therethrough. The base plate 16 has a plurality of radially spaced, concentric circular grooves 24 in its inner surface 18. Connecting grooves 26 extend radially between the adjacent grooves 24. The base plate 16 has inlet and outlet passages (not shown) extending therethrough from its outer edge to the innermost and outermost of the grooves 24. Thus, the grooves 24 and 26 provide a channel for the flow of a temperature control medium. A cap plate 28 extends across the inner surface 18 of the base plate 16 and is secured to the base plate 16, such as by welding, brazing or the like. The cap plate has a central hole 30 therethrough which is in alignment with the hole 22 in the base plate. The cap plate 28 has a mold cavity in its surface which is of a size and shape corresponding to one-half the disc to be molded. A center plate 32 is secured within the holes 22 and 30. The cap plate 32 has a longitudinal passage 34 therethrough and a radially outwardly extending flange 36 at its end adjacent the cap plate 28. A center hole forming pin 38 is slidably mounted in the passage 34 in the center plate 32. A stamper 40 extends across the mold cavity in the surface of the cap plate 28 and has a center hole 42 therethrough. The edge of the hole 42 is clamped between the surface of the cap plate hole 30 and the center plate flange 36 to secure the stamper to the mold member 12. The outer edge of the stamper 40 is secured to the mold member 12 by a suitable clamp, not shown.

The lower mold member 14 includes a base plate 44 having flat inner and outer surfaces 46 and 48 respectively and a hole 50 through the center thereof. The base plate 44 has a plurality of radially spaced, concentric circular grooves 52 in its inner surface 46 with connecting grooves 54 extending radially between adjacent circular grooves 52. The base plate 44 has inlet and outlet passages (not shown) extending therethrough from its outer periphery to the innermost and outermost grooves 52 to provide a channel for the flow of a heat control medium. A cap plate 56 extends across the inner surface 46 of the base plate 44 and is secured to the base plate 44. The cap plate 56 has a central hole 58 therethrough in alignment with the hole 50 in the base plate 44. The cap plate 56 has a mold cavity in its surface which is of a size and shape corresponding to one-half the size and shape of the disc to be molded. A center plate 60 is secured within the holes 50 and 58 and has a radially outwardly extending flange on its end adjacent the cap plate 56. A stamper 64 extends across the mold cavity in the cap plate 56, and has a central hole 66 therethrough. The edge of the stamper hole 66 is clamped between the surface of the cap plate hole 58 and the center plate flange 62 to secure the stamper 64 to the mold member 14. The outer edge of the stamper 64 is secured to the mold member by a suitable clamp, not shown.

Figure 2:
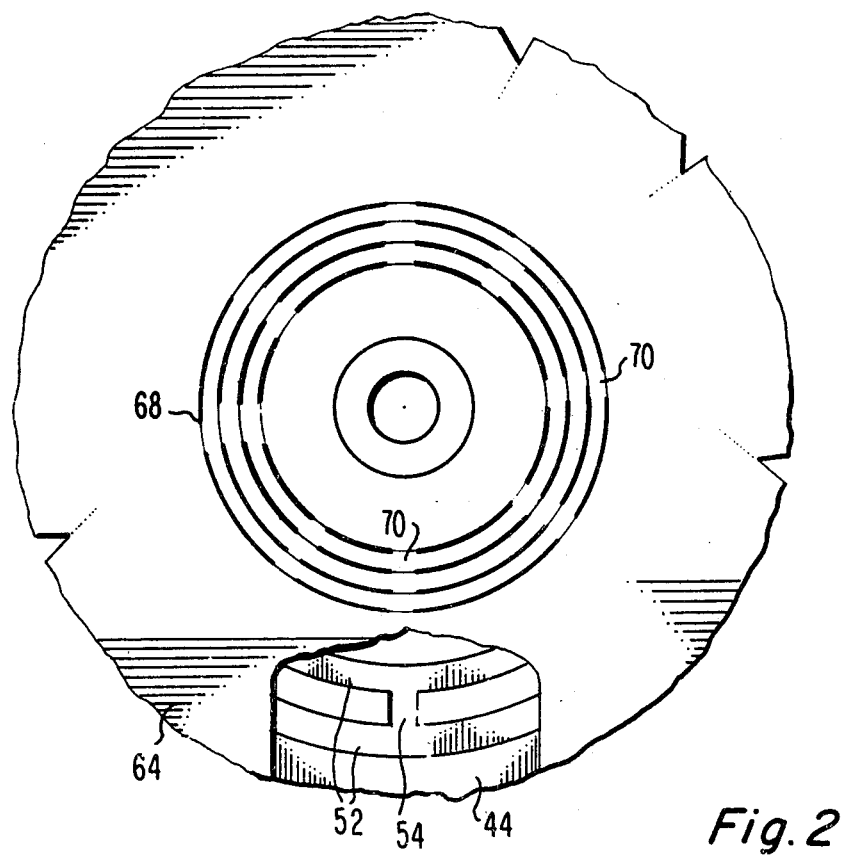
FIG. 2 is a top plan view, partially broken away, of the bottom mold member of the molding apparatus shown in FIG. 1.
Figure 3:
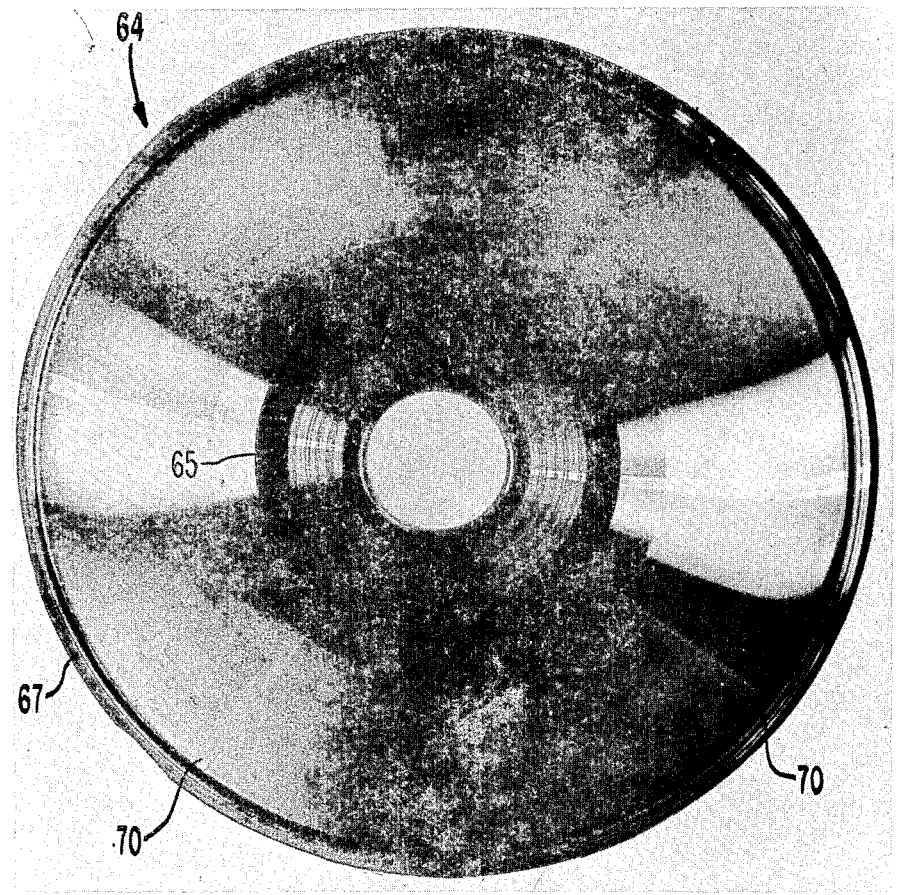
FIG. 3 is a photograph of the surface of a stamper which contains the required information.

In accordance with the present invention, the stampers 40 and 64 are positioned on their respective mold plates 12 and 14 so that any imperfections in the mold cavities are aligned with areas of the stamper which do not contain portions of the surface relief pattern which impacts the perceived picture quality. As shown in FIG. 3, these areas could be the unrecorded portions of the stampers 65 and 67 at the center or periphery of the stamper respectively, or any unrecorded portion along the information path, such as between two different subject matters recorded on the disc. Also, it could be along the blanking intervals 70, preferably the vertical blanking intervals which are longer than the horizontal blanking intervals and therefore easier to align with. For example, as shown in FIG. 2, the stamper 64 has a surface relief pattern arranged in a spiral path 68 on the surface thereof. The surface relief pattern has periodic vertical blanking intervals 70 which are positioned where the beam in the picture tube retraces from the end of the bottom line to the beginning of the top line. The blanking intervals 70 align themselves along radial lines which are the sync lines. As previously stated, the radially extending connecting grooves 54 in the base plate 44 can result in imperfections in the surfaces of the discs being molded. According to the present invention, the blanking intervals 70 in the stamper 64 are aligned over the connecting grooves 54. Thus, the imperfections caused by the grooves 54 are impressed in a blanking interval of the disc so that it does not adversely impact the perceived picture quality during the playback of the disc. To achieve the proper alignment of the stamper 64 on the mold member 14, each can be provided with suitable alignment marks which when aligned will indicate that the blanking intervals 70 are over the radial grooves 54.

Although the present invention has been specifically described with regard to compensating for the imperfections in the discs caused by the radial grooves of the temperature control medium channels, other imperfections in the mold cavity, such as scratches, nicks, and the like can be similarly compensated for. Thus, the present invention can minimize or eliminate adverse effects in the molded disc caused by defects in the mold member. The present invention does not eliminate the defect caused in the disc, but places it in a position on the disc where it does not adversely affect the playback of the disc so that the mold member having the defect can still be used even though it does have the defect. This eliminates the need for discarding the mold members having defects, which can be costly.

I claim:

1. In a method for molding a video disc wherein a mold cavity is filled with a plastic material with the mold cavity being formed between two opposed mold members each having a stamper over its surface forming the mold cavity and each mold member having imperfections which may pass through the stamper and be impressed on the surface of the molded disc, the improvement comprising relatively rotating the stamper on the mold member so that areas of the stamper which do not contain information which will impact the perceived quality of the picture provided by the information are aligned with said imperfections in the mold members.

2. A method in accordance with claim 1 wherein each of the stampers has on its surface a surface relief pattern arranged in a spiral path with periodic blanking intervals being provided along the spiral path and these blanking intervals are aligned with the imperfections in the mold member.

3. A method in accordance with claim 2 in which the blanking intervals in the surface relief pattern are positioned so that they are arranged along angularly spaced radially extending lines and the lines of the blanking intervals are positioned over the imperfections in the mold member.

4. A method in accordance with claim 3 in which each mold member contains a channel through which a temperature control medium can flow which channel includes radially extending portions and the blanking intervals on the stampers are positioned over the radially extending portions of the channels.

5. A method in accordance with claim 1 wherein the imperfections are aligned with unrecorded portions of the stamper.

6. In an apparatus for molding a video disc which includes a pair of opposed mold members each having a mold cavity in its surface which faces the other mold member, a stamper mounted across each of the mold cavities, and each mold member having imperfections which may pass through the stampers and be impressed on the surface of the molded disc, the improvement comprising the circumferential position of the stampers with respect to the molds is arranged so that areas of the stamper which do not contain information which will impact the perceived picture quality are aligned with said imperfections in the mold members.

7. An apparatus in accordance with claim 6 wherein each of the stampers has on its surface a surface relief pattern arranged in a spiral path with periodic blanking intervals being provided along the spiral path and the blanking intervals are aligned over the imperfections in the mold member.

8. An apparatus in accordance with claim 7 in which the blanking intervals in the surface relief pattern are positioned so as to be arranged along angularly spaced radially extending lines and the lines of the blanking intervals are positioned over the imperfections in the mold member.

9. An apparatus in accordance with claim 8 in which each mold member contains a channel through which a temperature control medium can flow which channel includes radially extending portions and the blanking intervals on the stampers are positioned over the radially extending portions of the channels.

10. An apparatus in accordance with claim 6 wherein each of the stampers has on a portion of its surface a surface relief pattern arranged in a spiral path and the imperfections in the mold cavity are aligned with areas of the stamper which do not contain the surface relief pattern.

* * * * *